Figure 1:
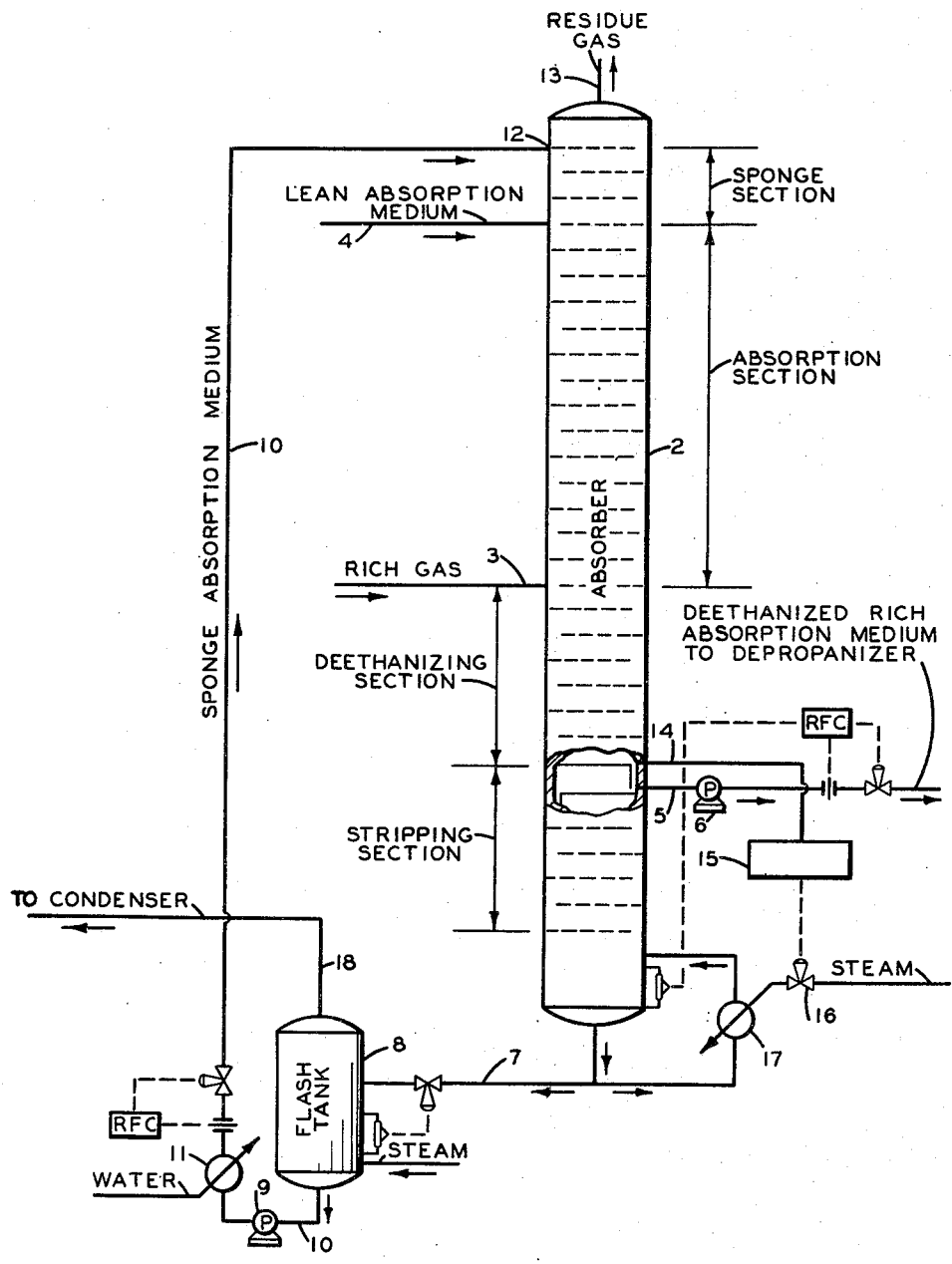

INVENTOR.
F.E. GILMORE

United States Patent Office 2,710,278
Patented June 7, 1955

2,710,278

METHOD OF SUPPLYING A SPONGE ABSORPTION MEDIUM TO A FRACTIONATING ABSORBER

Forrest E. Gilmore, Bartlesville, Okla., assignor to Phillips Petroleum Company, a corporation of Delaware Application December 15, 1950, Serial No. 200,944

5 Claims. (Cl. 196—8)

This invention relates to an improved method for the recovery of heavier hydrocarbons from a gaseous hydrocarbon stream. In one aspect this invention relates to a method for preventing entrainment of the absorption medium by the vapors leaving the absorber wherein heavier hydrocarbons are absorbed from a gaseous hydrocarbon stream. Still another aspect of this invention relates to a method for using the heavier and less volatile ends of the absorbing medium as a sponge medium to prevent loss of absorption medium to the residue gas leaving the absorber in a process for the recovery of heavier hydrocarbons from a gaseous hydrocarbon stream and to a method for controlling the temperatures of the steps of the process.

In the operation of a fractionating absorber for the recovery of propane and heavier hydrocarbons from a gaseous hydrocarbon stream it is important that a relatively low molecular weight absorption medium be used for maximum absorption of these low molecular weight hydrocarbons for the reason that mutual solubility of hydrocarbons is greatest when their molecular weights are similar. However, the use of such light absorption medium, for example, debutanized gasoline, results in loss of volatile components of absorption medium by vaporization and by entrainment with the residue gas leaving the absorber.

The use of a sponge oil to absorb and recover vaporized and entrained absorption medium is well known. It is also well known that the sponge oil should have higher molecular weight than the absorption medium with which it is used in order to absorb entrained absorption medium without being itself entrained. When using a sponge oil in conjunction with a light absorption medium such as debutanized gasoline it is common practice to use a light gas oil or light cycle oil as the sponge oil. When used in the same tower with the absorption medium the sponge oil is usually introduced on the top tray and is trapped out a few trays below, but above the feed tray for the lean absorption medium. This system works very well except when leaks occur on the trap out tray. This has happened resulting in the contamination of a substantial quantity of gasoline since the stripped absorption medium (debutanized gasoline) comprises a portion of the gasoline produced in such refinery operation.

Therefore, a choice must be made between loss of absorption medium to residue gas by operating without a sponge oil or assuming the risk of contamination of product gasoline by using a sponge oil to recover absorption medium. It has occurred to me that this difficulty can be overcome by using a sponge medium whose end boiling point is not higher than the end boiling point of the absorbing medium. Thus a sponge medium which is not an oil but is a very narrow cut of the absorption medium itself having an initial boiling point of a least 275° F. and preferably above 320° F., composed of the heaviest fractions of the debutanized gasoline used as absorption medium.

Therefore, accordingly I have discovered that a sponge medium can be prepared from the absorption medium itself after it has passed through the stripping section of the fractionator absorber and then through a flashing step to produce a sponge medium having an initial boiling point of at least 275° F. The flashing step following the stripping step is necessary because otherwise it would require entirely too much heat to attain the temperature in the stripping zone necessary to accomplish the amount of stripping required to produce this high boiling cut from the gasoline. The temperatures required would approach cracking temperatures.

In the operation of my invention, or a method similar thereto, for example a fractionating or deethanizing absorber used in connection with a natural gasoline plant, or in connection with a gas recovery plant in a refinery, the reboiler temperature is usually used to control the degree of deethanization. As a result of the variation in the composition of the feed gases and consequently the composition of the enriched absorption medium the same temperature in the reboiler may remove all the ethane and too much of the propane at one time and leave too much ethane at another time. Other methods of control have been used, for example, controlling the steam or other heat to the absorber reboiler by means of the temperature at the top of the depropanizer to which the bottoms of the absorber are fed, the reason being that the higher the ratio of ethane to propane the lower the depropanizer top temperature will be. This and other methods are unsatisfactory beacuse of the inherent lag in time and in inaccuracies as to temperature.

I have found that what is needed is a means of controlling the quantity of heat supplied to the reboiler, without regard to temperature variation, in order to keep the ethane content to the desired minimum without appreciable lag in its operation.

Acting upon my finding, just described, I have discovered that the temperature of the reboiler of the absorber can be controlled by the ethane content of the reboiler by feeding a small amount of the vapors from the reboiler or, if these are too hot, vapors from any tray in the reboiler section, to a continuous infra-red analyzer controller arranged to actuate a motor valve on the steam, or other heating means, supply line to the absorber reboiler. Similar arrangements can be used on the reboilers of the depropanizer and debutanizer, or such equipment as is now employed in the art, using the infrared analyzer controller to measure and control the propane in the depropanizer bottoms and butane in the debutanizer bottoms by controlling the quantity of heat applied to the reboilers.

The mechanics as well as the operation of an infra-red analyzer are well known and will not be described in detail.

Returning now to the method of recovery of the present invention, I have found that operating by the method of this invention has resulted in relieving the load on equipment downstream from the absorber and also in permitting a heavier load to be placed upon the absorber. When thus operating according to my invention the need of a trap out tray for the sponge medium is eliminated since the sponge medium, being a portion of the gasoline absorption medium, can continue down the fractionator absorber and become a portion of the gasoline product. Therefore separate handling of this other medium is eliminated.

Accordingly it is an important object of this invention to provide a sponge absorption medium for use in a hydrocarbon absorption process.

It is another object of this invention to provide a sponge absorption medium having an end boiling point substantially the same as the end boiling point of the absorption medium used in a process wherein light hydrocarbons are absorbed from a gaseous hydrocarbon stream.

It is still another object of this invention to provide a method for producing a sponge absorption medium in a hydrocarbon absorption process using debutanized gasoline as the absorption medium wherein the end boiling point of the sponge medium will be substantially the same as the end boiling point of the debutanized gasoline used as the absorption medium.

It is still another object of this invention to provide a method for controlling the temperature of the reboiler of a fractionating absorber or a fractionator, which will control the heat supplied to the reboiler, to the degree required to secure the minimum content of the lightest hydrocarbon present in the absorber or fractionator bottoms, regardless of the fluctuation in composition of the bottoms stream.

Figure 2:
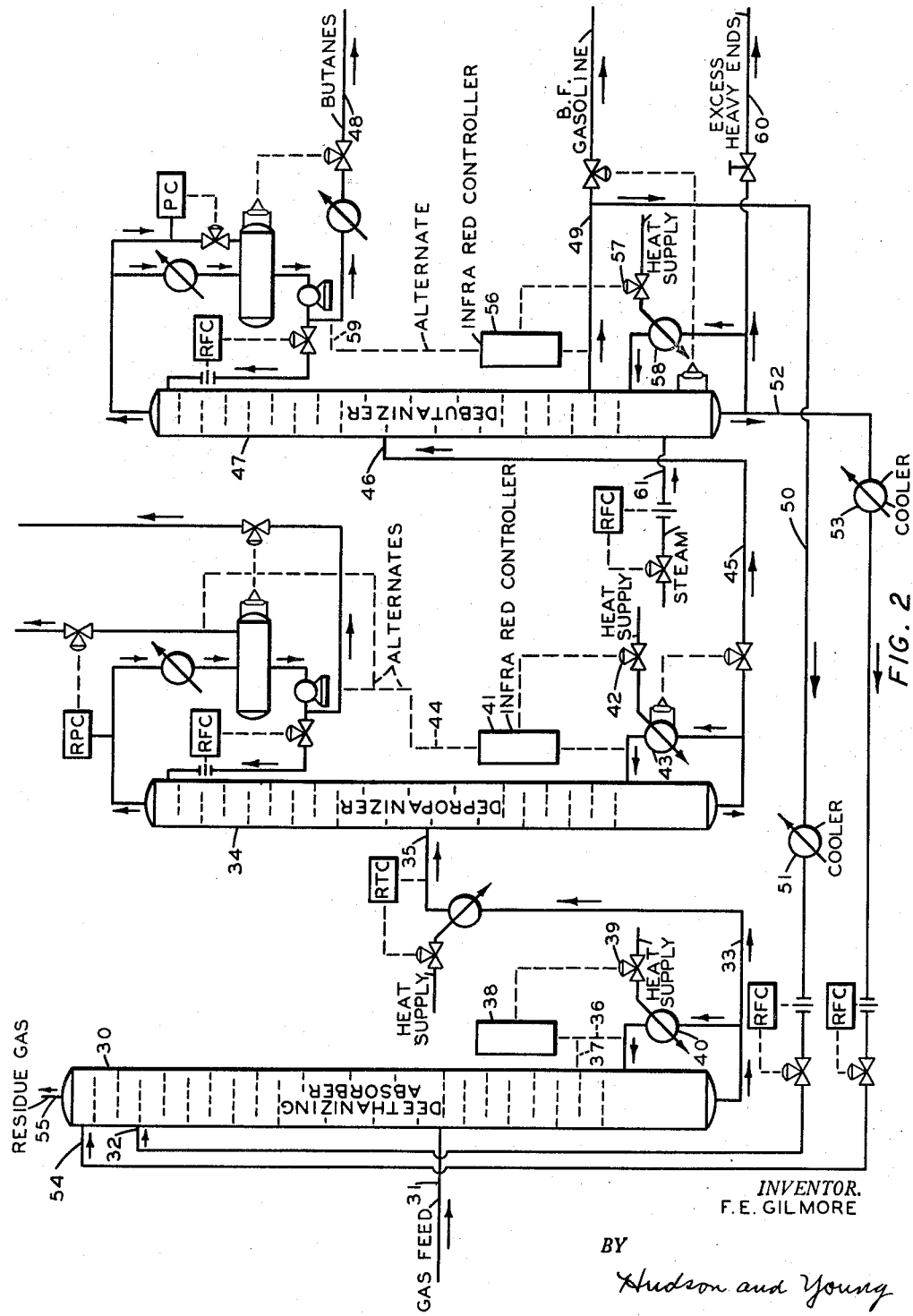

Other objects of this invention will be apparent to those skilled in the art in possession of this disclosure, drawings and claims:

The operation of my invention will be more fully illustrated by reference to the attached drawings wherein Figure 1 is a diagrammatic drawing of a fractionating absorber and Figure 2 is a diagrammatic drawing showing a modification of my invention wherein the stripping step to produce the sponge medium is conducted in the debutanizer.

In the attached drawings the process described is an absorber system operated in conjunction with a catalytic cracking unit.

In Figure 1 a fractionating absorber 2 is supplied with a rich gas stream at 3. A lean absorption medium such as debutanized gasoline enters the absorber at 4, several trays from the top and travels down the absorber countercurrently to the rising gas stream absorbing ethane and heavier hydrocarbons from the gas stream. Below the rich gas entry the ethane is detached from the rich absorption medium as a result of increasing temperature. This rich absorption medium is removed from the absorber at the bottom of the deethanizing section at 5 and pumped by pump 6 to a depropanizer (not shown). A portion of the deethanized absorption medium flows downwardly through the stripping section of the absorber where the lighter fractions of the enriched absorption medium are removed. This stripped absorption medium is fed from the bottom of the absorber by way of line 7 to a flash tank 8 where according to the practice of this invention the lighter fractions of the absorption medium are removed leaving a residue having an initial boiling point of at least 275° F. This residue, which, according to my invention, comprises the sponge absorption medium to absorb and condense vaporized and entrained absorption medium from the residue gas leaving the absorber, is pumped from the bottom of the flash tank by pump 9 through line 10 and cooler 11 to the top of the absorber where it enters at 12. This sponge absorption medium flows downwardly countercurrent to the residue gas containing ethane and lighter components leaving the absorber at 13 and absorbs and condenses vaporized and entrained absorption medium from this residue gas stream. This sponge absorption medium continues downwardly and commingles with and becomes a part of the enriched absorption medium since it was derived from this absorption medium. In the practice of this invention a small stream of vapor is taken from the bottom of the deethanizing section at 14 and fed to an infra-red analyzer controller at 15 which actuates motor valve 16 and thereby controls the steam to reboiler 17 in accordance with the amount of ethane in the bottom of the deethanizing section of the absorber.

The vapors from the flash tank 8 pass through line 18 to the main condenser (not shown) of the plant of which this absorption process is a part.

In Figure 2 a deethanizing absorber 30 is supplied with a rich gas feed at 31. A lean absorption medium (debutanized gasoline) enters the absorber at 32 several trays below the top and travels down the absorber countercurrent to the rising gas stream absorbing ethane and heavier hydrocarbons from the gas stream. Below the rich gas entry the ethane is detached from the enriched absorption medium as a result of increasing temperature. This rich absorption medium is removed at the bottom of the absorber and is conveyed by line 33 to a depropanizer 34 where it enters at 35. In the practice of this invention the reboiler temperature is controlled by feeding a small stream of vapors from the reboiler at 36, or if these are too hot, a few trays above the reboiler at 37, to a continuous infra-red analyzer controller 38 arranged to actuate motor valve 39 to control the heat supply to the reboiler 40 according to the amount of ethane in the vapors to the infra-red analyzer.

The heat supply to depropanizer 34 is, in a similar manner, controlled by an infra-red analyzer controller 41 which actuates motor valve 42 supplying heat to reboiler 43 in accordance with the amount of propane in the reboiler of the depropanizer. As an alternative to controlling the reboiler heat by means of the propane and/or propylene content of the depropanizer bottoms the reboiler heat can be controlled by means of the infra-red analyzer controller measuring the butane in the propane taken overhead, as at 44. The propane and lighter components are taken overhead to a deethanizer (not shown). The bottoms from the depropanizer are conveyed by line 45 to the feed tray 46 of the debutanizer 47 where butanes are taken overhead by line 48 to storage (not shown). Debutanized gasoline is taken a few trays (4 to 8) above the bottom of the debutanizer by line 49 to gasoline storage (not shown). A portion of this stream passes by line 50 through cooler 51 to the absorber 30 where it enters at 32 as the lean absorption medium. The bottom product of the debutanizer comprises the heavy or high boiling fractions of the gasoline preferably having a boiling range of about 300° F. to 450° F. and according to the practice of my invention comprises the sponge absorption medium used in this process. This sponge absorption medium is taken from the bottom of the debutanizer by line 52 through cooler 53 to the absorber 30 where it enters at the top at 54. This sponge absorption medium flows downwardly countercurrent to the residue gas containing ethane and lighter components leaving the absorber at 55 and condenses and absorbs entrained and vaporized absorption medium from this residue gas stream. This sponge absorption medium continues down the absorber and commingles with and becomes a part of the enriched absorption medium since it was derived from this absorption medium.

In the practice of this invention the heat to the reboiler of the debutanizer is controlled by feeding a small stream of the debutanized gasoline, taken from the debutanizer by line 49, to an infra-red analyzer controller 56 which actuates motor valve 57 and thereby controls the steam to the reboiler 58 in accordance with the amount of butane in the debutanized gasoline make. An alternate method of controlling the heat to the debutanizer reboiler by means of the butane content of the debutanized gasoline is to control the heat to the reboiler by means of the infra-red analyzer controller measuring the pentane content of the butane taken overhead. This is shown by taking a small stream from the overhead product line at 59 to the infra-red analyzer controller 56.

The excess high boiling fractions of the gasoline, over that needed as sponge absorption medium, can be conveyed to gasoline storage (not shown) by line 60. To avoid cracking, steam can be supplied at 61.

In this modification of the invention the flashing step can be omitted because of the high temperature and the steam in the bottom of the debutanizer.

Reasonable variation and modification are possible within the scope of the foregoing disclosure, drawings and the appended claims to the invention the essence of which is the providing of a sponge absorption medium for use with a light absorption medium such as debutanized gasoline by using a heavier portion of the absorption medium as the sponge absorption medium, and/or using an infra-red analyzer controller to control the supply of heat to a fractionator or absorber reboiler in accordance with the amount of lighter hydrocarbons present in the reboiler.

I claim:

1. In a hydrocarbon gas absorption method, in which a rich gas is treated to remove certain enriching components therefrom thus to form a lean or residue gas which under the operating conditions unavoidably entrains absorption medium causing a loss thereof, the steps of: treating said rich gas in an absorption zone with a gasoline absorption medium, thus producing the said residue gas; recovering by a single flashing operation from the thus enriched gasoline absorption medium a sponge absorption medium having an initial boiling point of about 275° F. to 320° F.; and passing said sponge absorption medium into countercurrent flow absorption relationship with the said residue gas to remove from the residue gas about to leave the said absorber zone entrained absorption medium.

2. In a hydrocarbon gas absorption method, in which a rich gas is treated to remove certain enriching components therefrom thus to form a lean or residue gas which entrains absorption medium causing a loss thereof, the steps of: in combination, introducing to a locus near the top of an absorber zone a gasoline absorption medium, introducing a rich gas containing at least one of ethane, propane and butane, into a locus at a point beween the said first mentioned locus and a deethanizing section located in a lower portion of said zone, causing countercurrent contact of said gasoline with said rich gas to absorb ethane and any heavier gases therefrom, causing said enriched gasoline to be deethanized in said deethanizing section, removing a portion of said deethanized gas enriched gasoline from said zone for further treatment, stripping remaining deethanized gasoline in a stripping zone, to further remove light hydrocarbon therefrom; then flashing, in a flashing zone, said stripped gasoline to provide a sponge absorption medium having an initial boiling point in the range of about 275° F. to 320° F., and introducing said sponge absorption medium to the top of a sponge section in said absorber zone above the locus of introduction of said gasoline absorption medium to remove from the residue gas about to emerge therefrom entrained absorption medium and recovering said sponge absorption medium and removed entrained absorption medium in the main body of absorption medium in the absorber zone.

3. A method according to claim 2 wherein the said gas enriched deethanized gasoline is treated to remove at least one of any propane and butane therefrom and is then employed as the said absorption medium.

4. A method according to claim 2 wherein the said gasoline is flashed to produce the said sponge absorption medium having an initial boiling point in the range of about 275° F.

5. In a hydrocarbon gas absorption process, in which a rich gas is treated to remove certain enriching components therefrom thus to form a lean or residue gas which entrains absorption medium causing a loss thereof, the steps of; introducing to a locus near the top of an absorber zone, a gasoline absorption medium hereinafter described; introducing a rich gas containing at least one of ethane, propane and butane, into a locus at a point between the said first mentioned locus and a deethanizing section located in a lower portion of said zone; causing countercurrent contact of said gasoline with said rich gas so as to absorb ethane and any heavier gases therefrom; causing said enriched gasoline to be deethanized in said deethanizing section; removing said deethanized gas enriched gasoline from said zone; removing and recovering propane from said enriched gasoline as a product of the process; removing and recovering, as the overhead product from a debutanizing zone, butanes from said enriched gasoline; removing and recovering debutanized gasoline from an intermediate point in said debutanizing zone; introducing a first portion of said debutanized gasoline to said absorber zone as said gasoline absorption medium; recovering a second portion of said debutanized gasoline as a product of the process; removing and recovering from the bottom of said debutanizing zone the fraction of gasoline boiling in the range of about 300 to 450° F.; introducing a first portion of said fraction boiling in the range of about 300 to 450° F. to the top of said absorber zone as sponge medium; and recovering the remaining portion as an additional product of the process.

References Cited in the file of this patent

UNITED STATES PATENTS

| | | |
|---|---|---|
| 2,261,498 | Karcher | Nov. 4, 1941 |
| 2,273,412 | McCullough | Feb. 17, 1942 |
| 2,324,954 | Rupp | July 20, 1943 |
| 2,335,855 | Hall | Dec. 7, 1943 |
| 2,386,057 | Noble | Oct. 2, 1945 |
| 2,386,830 | Wright | Oct. 16, 1945 |
| 2,428,521 | Latchum | Oct. 7, 1947 |
| 2,498,177 | Nelly, Jr. | Feb. 21, 1950 |